Sept. 8, 1964 W. P. FLOHR, JR 3,147,573
PRECISION INDEXING DEVICE
Filed March 28, 1963 3 Sheets-Sheet 1

INVENTOR
WILLIAM P. FLOHR JR.
BY
ATTORNEY

INVENTOR
WILLIAM P. FLOHR JR.
BY
ATTORNEY

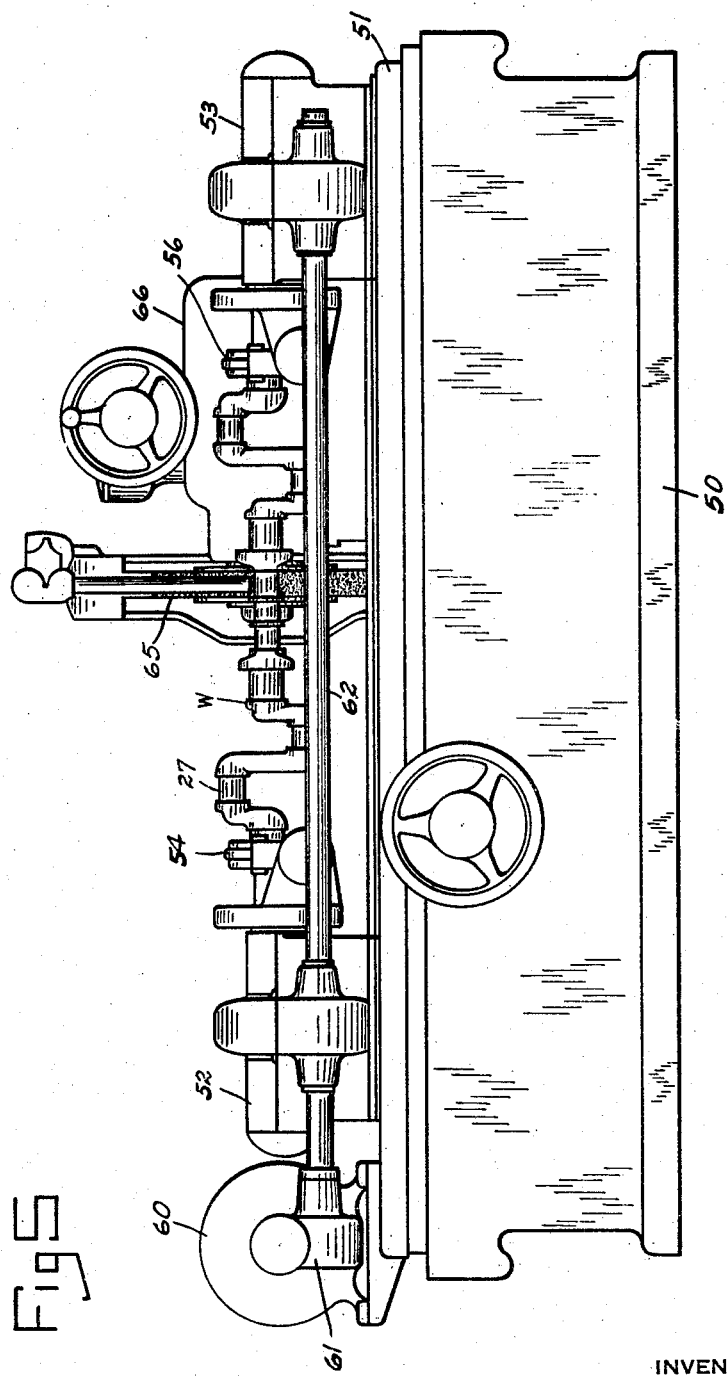

United States Patent Office 3,147,573
Patented Sept. 8, 1964

---

3,147,573
PRECISION INDEXING DEVICE
William P. Flohr, Jr., Waynesboro, Pa., assignor to Landis Tool Company, Waynesboro, Pa.
Filed Mar. 28, 1963, Ser. No. 268,615
3 Claims. (Cl. 51—105)

This invention relates to grinding machines, particularly machines for successively grinding the crankpins of an automotive crankshaft.

When grinding crankshafts automatically, the shaft is indexed automatically, both angularly and longitudinally. When shafts require high precision indexing, provision must be made for effecting such indexing automatically after the preindexing has been automatically completed. Angular indexing requires the application of a small force against the pin to be ground in order to make sure that the locating surfaces on the flange and on the headstock are firmly seated. If too much force is applied in affecting this precision indexing movement, the crank may be deflected to an off center position and clamped in that position.

It is, therefore, an object of the present invention to effect precision angular indexing of crankshafts without deflecting them.

Another object is to provide means for applying a yielding force to assure firm engagement between the locating surfaces.

Another object is to provide a common actuating means for effecting precision angular and longitudinal indexing.

FIG. 5 is a front elevation of a crank grinding machine.

Figure 1:
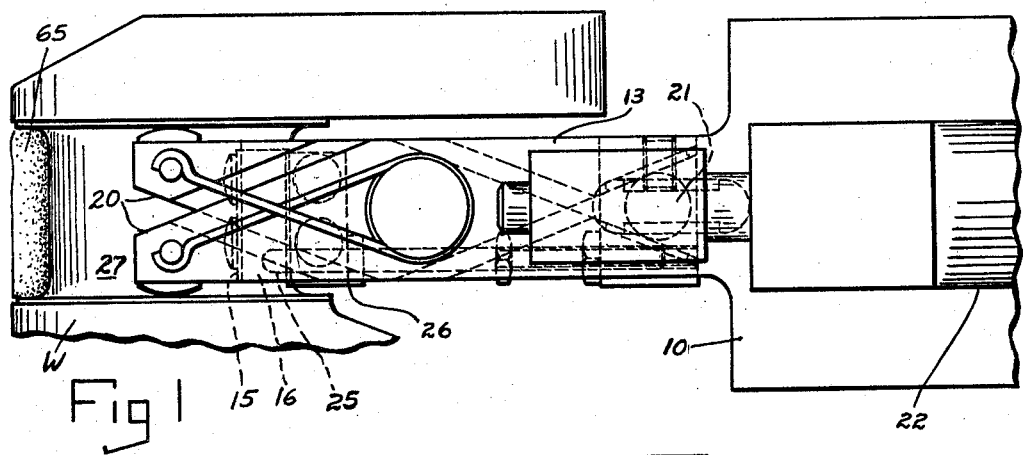
FIG. 1 is a partial plan view of a combination indexing device for effecting precision longitudinal and angular indexing of a crankshaft.
Figure 2:
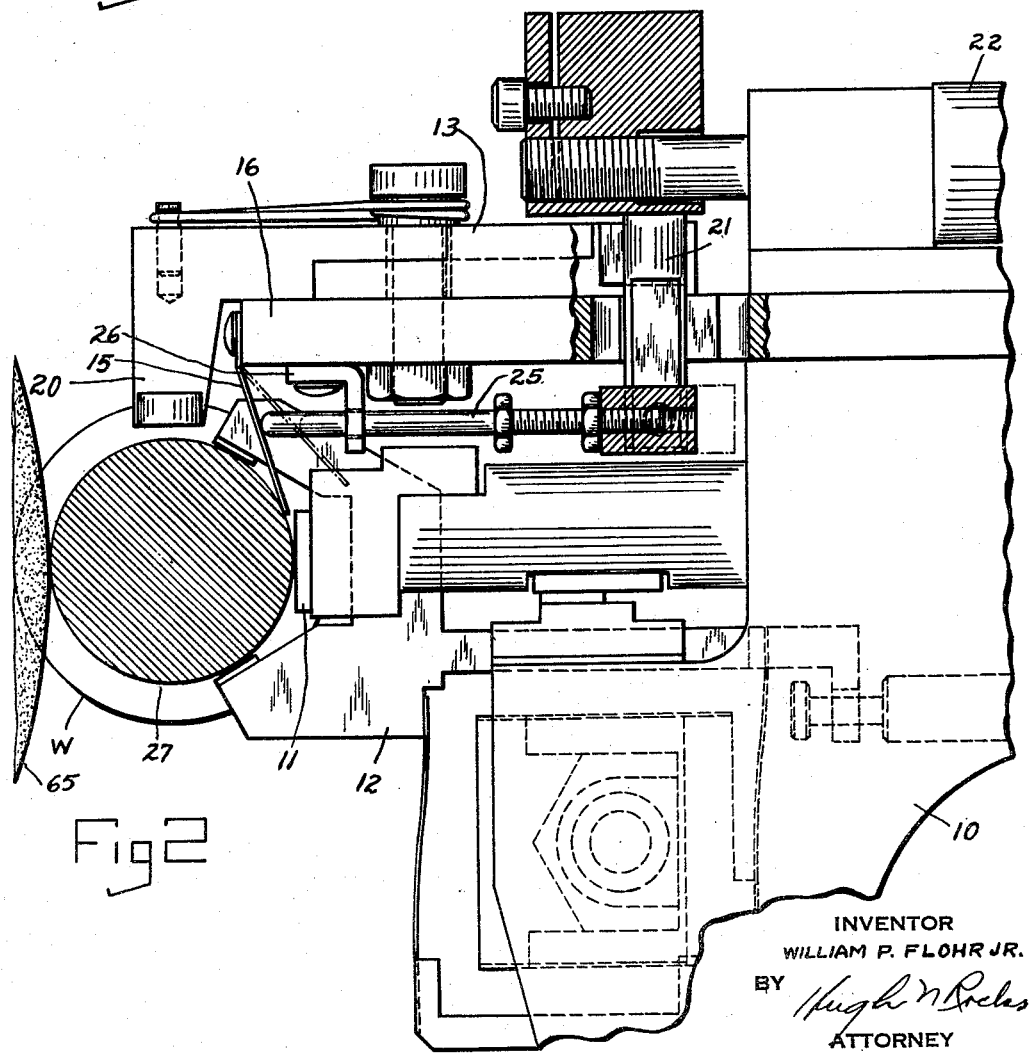
FIG. 2 is a partial left hand view of the combination indexing device.
Figure 3:
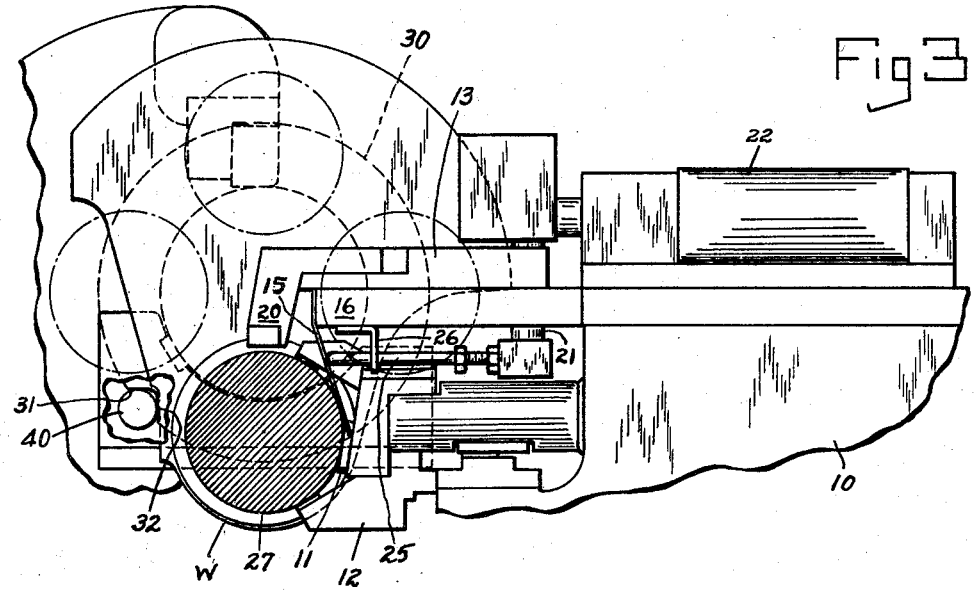
FIG. 3 is a right hand view similar to FIG. 2, but including the flange and locating pin.
Figure 4:
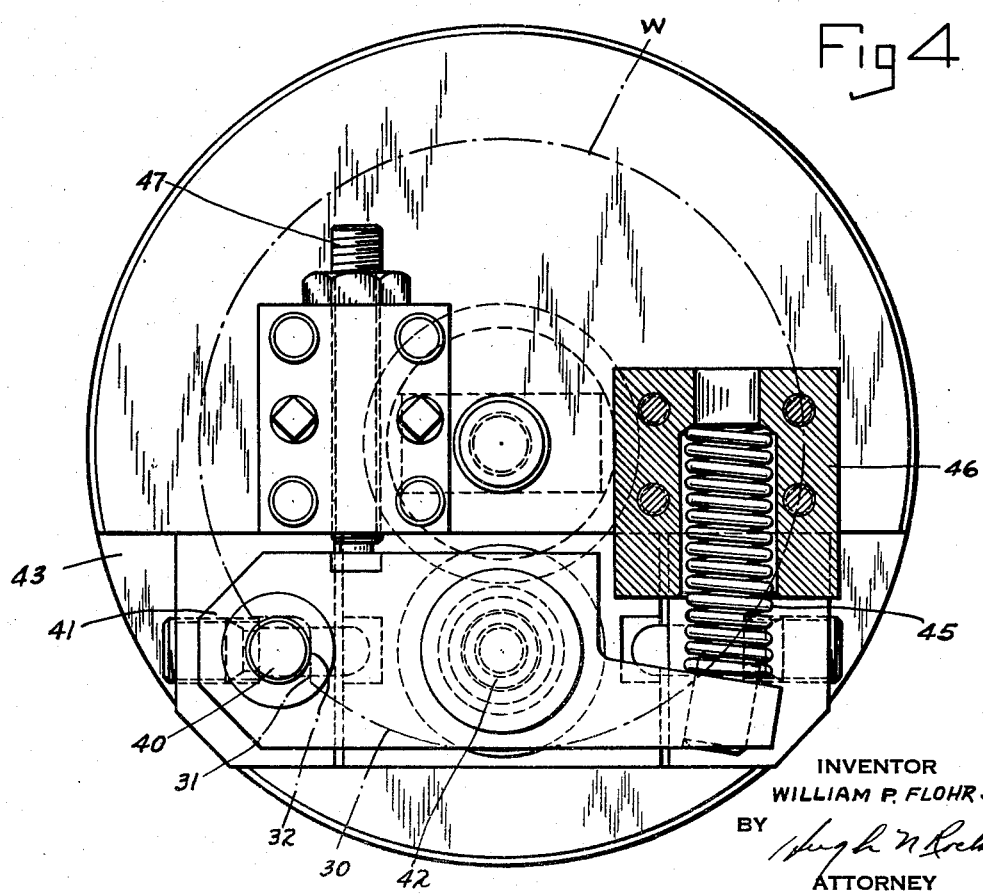
FIG. 4 is a left hand end elevation of a crank clamping fixture showing the mounting of the locating pin.

Numeral 10 indicates a support member similar to that disclosed in Ralph E. Price et al. application, Serial No. 93,249, filed March 3, 1961, now Patent No. 3,118,258, carrying a steady rest shoe 11, caliper 12, and a longitudinal locating member 13.

A flat spring 15 is attached to support member 16 upon which locating member 13 is supported. When member 13 is advanced into the position shown in order to perform a longitudinal locating operation, spring 15 moves with it. However, in the advance position of locating member 13, spring 15 is preferably out of contact with the surface of crankpin 27. When fingers 20 of locating member 13 are spread to engage the shoulders of crankshaft W, the vertical actuating pin 21 which spreads fingers 20, is advanced by a pressure operated device 22.

Plunger 25 supported by bracket 26 attached to the underside of support member 16 advances into engagement with spring 15, moving said spring into engagement with crankshaft W and applying sufficient force to effect a slight clockwise movement of crankshaft W.

Crankshaft W is rotatably supported in a machine (FIG. 5) having a bed 50 and a work carriage 51 slidably mounted thereon. Means for rotatably supporting crankshaft W consists of a pair of crankheads 52 and 53 having clamping fixtures 54 and 55 respectively. The means for rotating crankshaft W is a motor 60 connected through suitable gearing 61 and drive shaft 62 to both crankheads 52 and 53. The several crankpins 27 are successively subjected to the action of grinding wheel 65 rotatably mounted on wheel support 66.

Flange 30 of crankshaft W has a notch 31 with a locating surface 32. Locating surface 32 bears against pin 40 supported on arm 41 pivotally supported at 42 on index plate 43. Arm 41 is urged in a clockwise direction by spring 45 mounted in housing 46 on index plate 43. Clockwise movement of arm 41 is limited by the adjustable stop screw 47. A similar stop screw can be substituted for spring 45 to provide a more rigid angular adjustment of arm 41.

The headstock (not shown) rotates in a clockwise direction. When crankshaft W is indexed, rotation of crankshaft W stops while the headstock continues to rotate in a clockwise direction. During this indexing operation, because of the relative movement between the headstock and crankshaft W, locating surface 32 is urged against pin 40. After the indexing operation is completed, rotation of the headstock is stopped.

When the indexing operation is completed, locating surface 32 and pin 40 may be separated. In order to restore firm contact between locating surface 32 and pin 40, spring 15 is urged by plunger 25 against crankpin 27 to apply a clockwise force on crankshaft W.

Preferably, a plunger 25 is adjusted so as to engage spring 15 and effect rotation of crankshaft W before fingers 20 engage the side walls of crankpin 27.

I claim:

1. Means for effecting precision longitudinal and angular positioning of a crankpin on a crankshaft in a crank grinding machine having a rotatable grinding wheel and means for rotatably supporting said crankshaft in operative relation to said grinding wheel comprising a pair of side wall engaging members to shift said crankshaft axially for aligning said crankpin with said grinding wheel, a locating member for engaging a locating surface on said crankshaft, yielding means for engaging said crankpin to urge said crankshaft angularly to effect firm contact between said locating surface on said crankshaft and said co-acting locating member, and power means for actuating said yielding means and said side wall engaging members.

2. Means for effecting precision longitudinal and angular positioning of a crankpin on a crankshaft in a crank grinding machine having a rotatable grinding wheel and means for rotatably supporting said crankshaft in operative relation to said grinding wheel comprising a pair of side wall engaging members to shift said crankshaft axially for aligning said crankpin with said grinding wheel, a locating member for engaging a locating surface on said crankshaft, yielding means for engaging said crankpin to urge said crankshaft angularly to effect firm contact between said locating surface on said crankshaft and said co-acting locating member, and power means for successively actuating said yielding means and said side wall engaging members.

3. Means for effecting precision longitudinal and angular positioning of a crankpin on a crankshaft in a crank grinding machine having a rotatable grinding wheel and means for rotatably supporting said crankshaft in operative relation to said grinding wheel comprising a pair of side wall engaging members to shift said crankshaft axially for aligning said crankpin with said grinding wheel, a locating member for engaging a locating surface on said crankshaft, yielding means for engaging said crankpin to urge said crankshaft angularly to effect firm contact between said locating surface on said crankshaft and said co-acting locating member, and a single power means for actuating said yielding means and said side wall engaging members.

References Cited in the file of this patent
UNITED STATES PATENTS 2,820,332   Snyder _____ Jan. 21, 1958
2,848,849   Balsiger _____ Aug. 26, 1958